(12) United States Patent
Graham et al.

(10) Patent No.: US 7,904,761 B1
(45) Date of Patent: Mar. 8, 2011

(54) METHOD AND APPARATUS FOR A DISCRETE POWER SERIES GENERATOR

(75) Inventors: Jeffrey Allan Graham, Edinburgh (GB); David I Lawrie, Heriot (GB)

(73) Assignee: Xilinx, Inc., San Jose, CA (US)

( * ) Notice: Subject to any disclaimer, the term of this patent is extended or adjusted under 35 U.S.C. 154(b) by 1102 days.

(21) Appl. No.: 11/388,267

(22) Filed: Mar. 24, 2006

(51) Int. Cl.
*G06F 11/00* (2006.01)
*G06F 13/00* (2006.01)
*G06F 13/28* (2006.01)
*G06F 7/00* (2006.01)
*G06F 15/00* (2006.01)
*G11C 29/00* (2006.01)

(52) U.S. Cl. ......... 714/702; 714/701; 711/157; 708/200; 708/492

(58) Field of Classification Search .............. 708/270, 708/272, 276–277; 714/746, 752, 759, 761–762, 714/701–702; 711/219
See application file for complete search history.

(56) References Cited

U.S. PATENT DOCUMENTS

| | | | | |
|---|---|---|---|---|
| 5,162,666 A | * | 11/1992 | Tran | 327/408 |
| 5,442,306 A | * | 8/1995 | Woo | 326/39 |
| 5,745,393 A | * | 4/1998 | Wong | 708/209 |
| 7,051,261 B1 | * | 5/2006 | Dhamankar | 714/755 |
| 7,058,874 B2 | * | 6/2006 | Zhou | 714/756 |
| 7,155,642 B2 | * | 12/2006 | Han | 714/701 |
| 7,318,184 B2 | * | 1/2008 | Ishida | 714/755 |
| 2004/0220988 A1 | * | 11/2004 | Barry et al. | 708/446 |
| 2007/0101231 A1 | * | 5/2007 | Kutz et al. | 714/755 |

OTHER PUBLICATIONS

Xilinx, Inc.; U.S. Appl. No. 11/368,128 by Graham et al. on Mar. 3, 2006.

* cited by examiner

*Primary Examiner* — Chat C Do
*Assistant Examiner* — Matthew Sandifer
(74) *Attorney, Agent, or Firm* — Michael T. Wallace; LeRoy D. Maunu (57) ABSTRACT

A method and apparatus for the generation of discrete power series values (PSVs) and associated PSV addresses. Repeated evaluations of a discrete power series are performed by a reduced complexity PSV generator, such that the need for multiplication operations is obviated. Each evaluation cycle performed by the reduced complexity PSV generator is modified by each primitive root of the desired discrete power series. For each PSV generated, a corresponding address is calculated to indicate the correct placement of the PSV generated.

15 Claims, 7 Drawing Sheets

METHOD AND APPARATUS FOR A DISCRETE POWER SERIES GENERATOR

FIELD OF THE INVENTION

The present invention generally relates to discrete power series generators, and more particularly to reduced complexity, discrete power series generators.

BACKGROUND

Various applications of electronic circuitry involve the use of integrated circuits (ICs). ICs, for example, facilitate the ability to incorporate a very large number of circuit elements into a very small area. ICs are particularly useful when active components, such as transistors and diodes, are needed to implement a particular design. Using today's semiconductor technology, for example, hundreds of millions and even billions of active devices may be incorporated into a single IC.

As IC densities increase, however, the dimensions of these active components approach sub-micron levels. As such, atomic effects become increasingly prevalent, which may tend to eliminate any further downward scaling of the geometry of these active components in an effort to generate increased IC densities. Thus, design efforts may tend to look at system requirements for further improvements in IC implementations, which may tend to improve not only IC densities, but may also improve power consumption and speed.

Improvements in IC implementations, for example, may come from efforts to apply optimizations at the system architectural levels. In particular, reducing the complexity of circuit implementations tends to reduce the number of components required for the circuit implementations, which in turn, reduces the semiconductor area required.

Thus, while improvements in IC processing techniques continue to improve IC density levels, efforts should also continue to optimize circuit implementations that reduce the number of active components required. Often, the algorithmic and architectural innovations that achieve such optimizations may also improve other design parameters, such as speed of operation and power dissipation.

One such area where algorithmic and architectural innovations may be particularly helpful is in the field of communications. In particular, coding techniques for various communication standards may be employed to produce near error-free communications, even while operating in a noisy channel. Error codes may be employed, for example, to reduce the probability of error, $P_e$, at the receiving end of the transmission, to an arbitrarily small value through increased code block lengths.

As code block lengths increase, however, so does the complexity of the circuits that are required for their implementation, both at the transmitting end and at the receiving end. Additional complexity may also be added by interleavers that may be employed to increase the randomness of the coded block in an effort to thwart burst errors caused by a fading channel. Thus, latency problems may be created, due to the excessive memory and processing requirements of the coding and interleaving circuits.

Efforts continue, therefore, to reduce the complexity of the communication processors required by today's communication systems so as to: reduce latency bottlenecks through increased speed of operation; and to reduce power dissipation. Each improvement may be simultaneously gained, for example, by a decrease in the number of components required for their implementation.

SUMMARY

To overcome limitations in the prior art, and to overcome other limitations that will become apparent upon reading and understanding the present specification, various embodiments of the present invention disclose an apparatus and method for reduced complexity discrete power series generation circuits.

In accordance with one embodiment of the invention, a discrete power series generator comprises a base power series value (PSV) generator that is coupled to receive initial values and is adapted to generate a set of PSVs for each initial value received. The discrete power series generator further comprises a first memory block that is coupled to the base PSV generator and is adapted to provide the initial values to the base PSV generator. The discrete power series generator further comprises a base PSV address generator that is coupled to the base PSV generator and is adapted to provide an address for each PSV generated.

In accordance with another embodiment of the invention, a power series generator comprises a modulus operation block that is coupled to receive a current power series value (PSV) and a prime number and is adapted to perform a modulus operation on the current PSV using the prime number to generate a next PSV. The power series generator further comprises a first memory block that is coupled to the modulus operation block and is adapted to store the next PSV. The power series generator further comprises a PSV address generator that is coupled to the first memory block and is adapted to provide an address for storage of the next PSV within the first memory block.

In accordance with another embodiment of the invention, a method of generating discrete power series values (PSV) comprising retrieving at least one discrete power series (DPS) term from a memory block, cycling the DPS term through a plurality of shift-left operations, subtracting a prime number from each left-shifted DPS term to form a difference, selecting the left-shifted DPS term as the PSV in response to a negative difference, and selecting the difference as the PSV in response to a positive difference.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention may be applied to virtually any processing algorithm that requires the generation and/or manipulation of a discrete power series. Such applications, for example, may include encryption/decryption technologies and communication systems.

A discrete power series may be described by equation (1) as follows:

$$\{(x^i \bmod p) | i \in \{0:p-2\}\}, \quad (1)$$

where p is a prime number and x is a primitive root of p.

Equation (1) represents a pseudo-random (PN) sequence that does not repeat, making it useful for a range of communication systems. Given, for example, that the prime number, p, and the primitive root, x, are assigned values of 7 and 3, respectively, the resulting discrete power series as defined by equation (1) is $\{1, 3, 2, 6, 4, 5\}$.

Communication systems that utilize interleaving as a method of reducing burst errors resulting from channel fading may incorporate the use of equation (1). In particular, if a sequence of data symbols are transmitted using their original generation sequence, consecutively arranged data symbols may be attenuated by channel fading, thus reducing their received signal-to-noise ratio (SNR). Such a reduction in SNR, however, yields an increased probability of error for those reduced SNR data symbols and, therefore, increases the burst error rate.

The use of equation (1), therefore, may provide a method of adding randomization to the original data symbol sequence, in order to reduce the effects of channel fading. That is to say, for example, that instead of transmitting the data symbol sequence as originally generated, the order of data symbols may first be manipulated using a pseudo-random algorithm to rearrange, i.e., interleave, the data symbols to induce a reduction in the statistical dependence between adjacent data symbols. Once the rearranged data symbols have been received, the interleaving process may be reversed, i.e., deinterleaved, to rearrange the data symbols into their original generation sequence.

Figure 1:
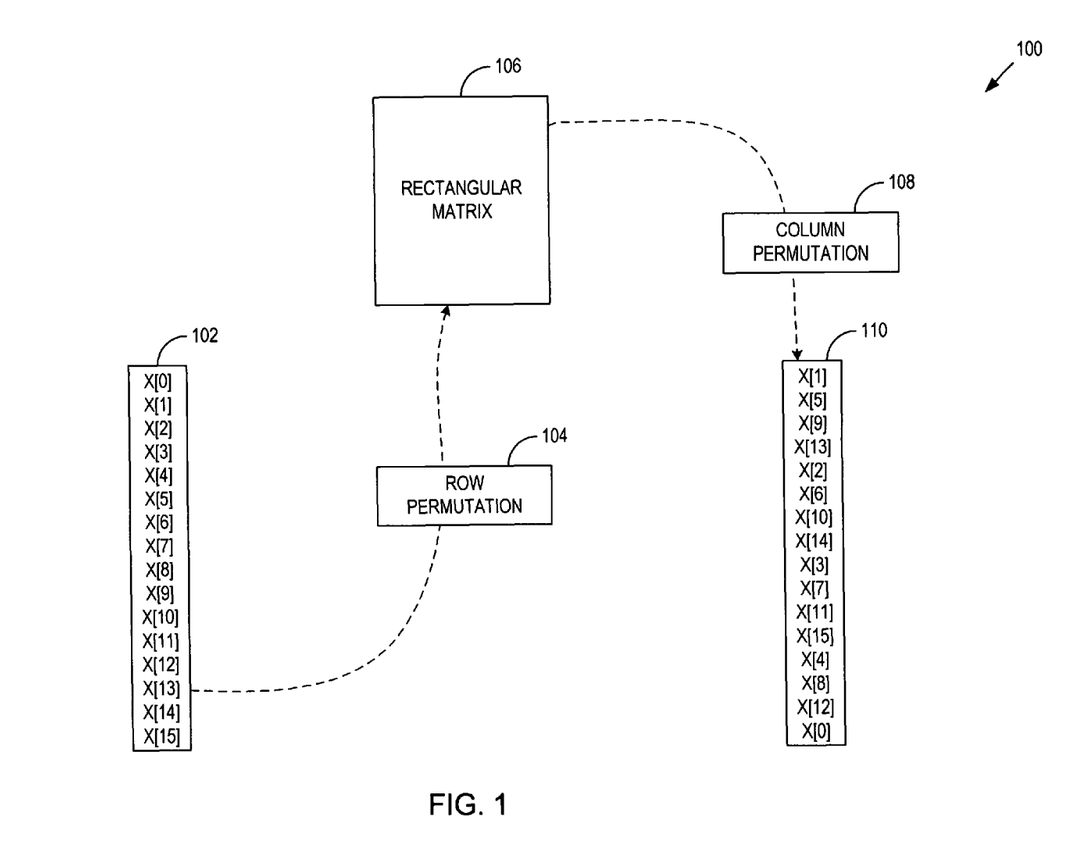
FIG. 1 illustrates an exemplary functional diagram of the operation of a block interleaver.

Turning to FIG. 1, exemplary block interleaver 100 is illustrated, in which permutations are applied to originally generated data symbol block 102, in order to obtain interleaved data symbol block 110. In particular, block interleaver 100 receives data symbol block 102, which may be comprised of an integer, N, number of data symbols, whereby in one example, N may be equal to 16 as illustrated. It is recognized that other values of N may also be used depending upon the particular application.

Each transmission symbol, e.g., X(0)-X(15), may be row-wise written from data symbol block 102 into a memory block, e.g., rectangular matrix 106, in accordance with a first permutation algorithm as defined by row permutation block 104. In the case of a 4×4 rectangular matrix, for example, data symbols X(0)-X(3) may be written to row 1, data symbols X(4)-X(7) may be written to row 2, etc. While data symbols may be consecutively populated into rectangular matrix 106, as discussed above, it is understood that other intra-row permutations may also be implemented by row permutation block 104. For example, data symbols X(15)-X(12) may be written to row 1, data symbols X(11)-X(8) may be written to row 2, etc.

Once rectangular matrix 106 has been populated with each data symbol of data symbol block 102, data symbols X(0)-X(15) may then be read out of rectangular matrix 106 in accordance with a second permutation algorithm, as defined by column permutation block 108. In this instance, an inter-row permutation may be introduced, whereby data symbols are selected from various rows of a particular column of rectangular matrix 106 and placed into data symbol block 110 prior to transmission.

As can be seen, the location, or address, of each data symbol in data symbol block 102 has been changed in relation to its corresponding location, or address, in data symbol block 110. Thus, while the data symbols contained within data symbol blocks 102 and 110 are identical, their respective locations, or addresses, are different. The address locations of data symbols in data symbol block 102 and the address locations of data symbols in data symbol block 110 may be related by the mapping function, π, of equation (2):

$$\pi(Z \to Z): j = \pi(i), i, j \in \{0,1\}, \quad (2)$$

where Z represents natural numbers, 0, 1, . . . , N−1, and i,j represent indices of data symbols in data symbol blocks 102 and 110, respectively.

The mapping function, π, as described by equation (2), may be implemented, for example, by any number of algorithms whose output represents a pseudo-randomly generated output. In one embodiment, for example, the mapping function, π, may be generated by a discrete power series generator and then modified by a modulus-n operator to maintain a discretely sized mapping alphabet.

Figure 2:
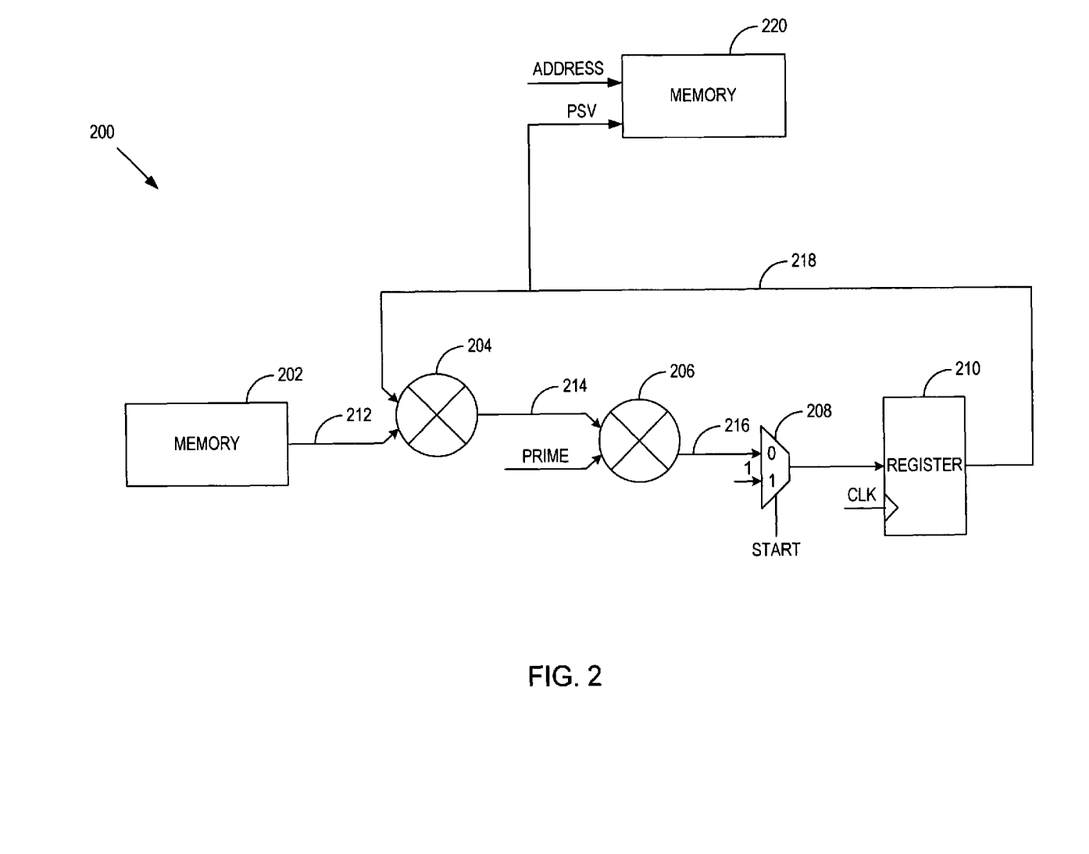
FIG. 2 illustrates an exemplary schematic diagram of a discrete power series value (PSV) generator.

Turning to FIG. 2, an exemplary block diagram of a discrete power series generator is illustrated. FIG. 2 represents an exemplary discrete power series generator, which may be used to generate sequences of the form:

$$PSV = \{(x^i \bmod p) | i \in \{0:p-2\}\} \quad (3)$$

where PSV is the discrete power series, x is a primitive root, p is a prime number, and mod is the modulus operator. Given, for example, that a discrete power series relating to equation (4), $$PSV = \{(5^n \bmod 7) | n \in \{0:7-2\}\} \quad (4)$$

is desired, then PSV may take on the values as listed in Table 1:

TABLE 1

| n | $5^n$ | PSV |
|---|---|---|
| 0 | 1 | 1 |
| 1 | 5 | 5 |
| 2 | 25 | 4 |
| 3 | 125 | 6 |
| 4 | 625 | 2 |
| 5 | 3125 | 3 |

The PSV values of Table 1 may then be used, for example, as the address locations of the post-interleaved data symbol block 110, while the values of n in Table 1, may be used as the address locations of the pre-interleaved data symbol block 102, as illustrated in Table 2.

TABLE 2

Symbol Location Map

X[0] at address 0 of 102 -> X[0] at address 1 of 110
X[1] at address 1 of 102 -> X[1] at address 5 of 110
X[2] at address 2 of 102 -> X[2] at address 4 of 110
X[3] at address 3 of 102 -> X[3] at address 6 of 110
X[4] at address 4 of 102 -> X[4] at address 2 of 110
X[5] at address 5 of 102 -> X[5] at address 3 of 110

Thus, by using discrete power series generator 200 as an address translator, the address of symbol X[0] has been mapped from address 0 of the pre-interleaved data symbol block 102 to address 1 of the post-interleaved data symbol block 110. Similarly, symbol X[1] has been mapped from address 1 of the pre-interleaved data symbol block 102 to address 5 of the post-interleaved data symbol block 110. Symbols X[2] through X[5] are similarly mapped as illustrated in. Table 2.

In operation, discrete power series generator 200 may generate values, PSV, as listed in Table 1 at signal 218. At the initialization stage, signal START is asserted, so that the data value "1" is output from multiplexer 208. Upon a transition of signal CLK, register 210 provides the data value "1" at signal 218 to generate the first PSV from discrete power series generator 200 to be stored in memory 220. It can be seen that the first PSV generated by discrete power series generator 200 is always 1, since the first PSV represents the primitive root, v, raised to the $0^{th}$ power, as illustrated in equation (3).

Figure 3:
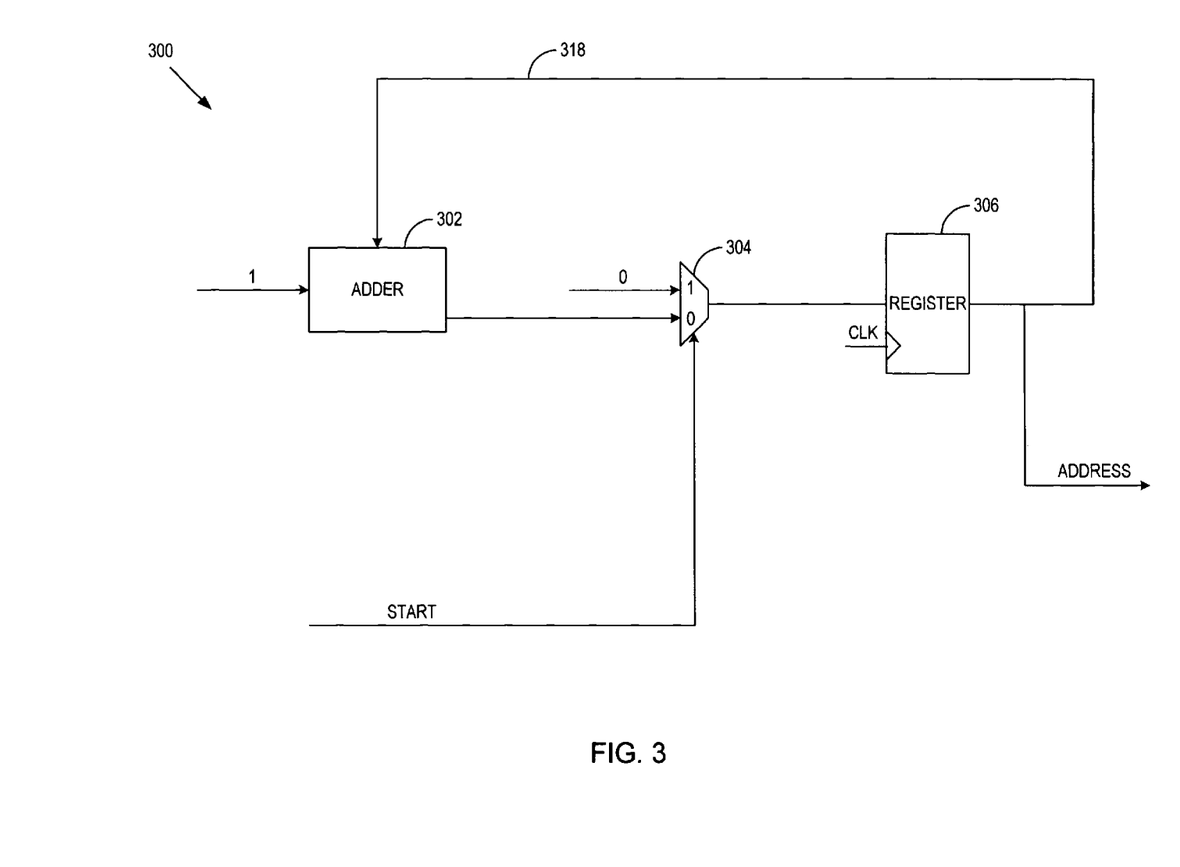
FIG. 3 illustrates an exemplary schematic diagram of a discrete PSV address generator.

Turning to FIG. 3, discrete PSV address generator 300 is exemplified, which is utilized to provide signal ADDRESS to memory 220 for each PSV generated by PSV generator 200. Discrete PSV address generator 300 receives an assertion of signal START at initialization, to provide the data value "0" at the output of multiplexer 304. Upon a transition of signal CLK, the data value "0" is provided at signal 318 as signal ADDRESS. Thus, address location 0 of memory 220 of FIG. 2 receives the first PSV, i.e., "1", as provided by signal 218. The first PSV, therefore, corresponds to the address of data symbol block 110 that is to receive data symbol, X(0), as listed in the first entry of Table 2. That is to say, in other words, that the post-interleaved address for symbol X[0], e.g., address 1, is stored at address location 0 of memory 220.

Generation of the second PSV begins with the deassertion of signal START. Memory block 202 of discrete PSV generator 200 is pre-loaded with values that are equal to the ratio of v/p of equation (3). The discrete power series of equation (4), for example, requires that the ratio of v/p=5/7. Multiplier 204 then receives the value, v/p=5/7, via signal 212, as well as the first PSV, i.e., "1", via signal 218. Multiplier 204 then generates the product of v/p with the first PSV at signal 214 according to equation (5):

$$\text{Signal}_{214}=\text{fract}(\text{PSV}*v/p), \quad (5)$$

whereby only the fractional portion of the output of multiplier 204 is provided to multiplier 206 via signal 214. Hence, the whole portion of the output of multiplier 204 at signal 214 is discarded.

Signal 214 is then multiplied by the value of p, e.g., signal PRIME, which for this example, is equal to 7. Thus, the product as provided by multiplier 206 at signal 216 is in accordance with equation (6):

$$\text{Signal}_{216}=\text{Signal}_{214}*p=\text{fract}(\text{PSV}*v/p)*p. \quad (6)$$

It can be verified, that signal 216 at the output of multiplier 206 provides the modulus operation of equation (4). For example, the ratio, p/v=5/7, evaluates to 0.714285, which when multiplied by the first PSV, i.e., 1, also evaluates to 0.714285. This value, when multiplied by p=7, results in a value of 5 at signal 216, which correlates to the second PSV as listed in Table 1.

Turning back to FIG. 3, the address signal, ADDRESS, corresponding to the second PSV is generated. In particular, signal START is deasserted, which allows multiplexer 304 to select the output of adder 302. Since the value of signal 318 is "0", adder 302 performs the addition of a data value of "1" with a data value of "0" to provide a data value of "1" at its output. Upon the next transition of signal CLK, register 306 provides the value "1" at signal ADDRESS. Thus, the next PSV, e.g., 5, is then written to address location 1 of memory 220. That is to say, for example, that the post-interleaved address for symbol X[1], e.g., address 5, is stored at address location 1 of memory 220.

Continuing with PSV generator 200 of FIG. 2, the PSV of "5" is then multiplied by 5/7 by multiplier 204, to provide the product 3.571428571. Retaining the fractional portion of the product, as in equation (5), and again multiplying by signal PRIME, as in equation (6), the product of "4" results, which is then provided at signal 216 via multiplier 206. Upon the next transition of signal CLK, the third PSV, e.g., 4, is ready for storage into memory 220 via signal 218. The remaining PSVs, i.e., 6, 2, and 3, are generated in similar manner.

It should be noted, that continued operation of discrete power series generator 200 results in repetitions of the PSV values of Table 1. Thus, after PSV=3 has been generated, PSV=1 results as the subsequent PSV. In general, PSVs that are generated in accordance with equation (3), repeat after an integer multiple of (p−1) iterations have been computed. In the example as exemplified by Table 1, for example, the PSVs repeat after (p−1=6) iterations.

Figure 4:
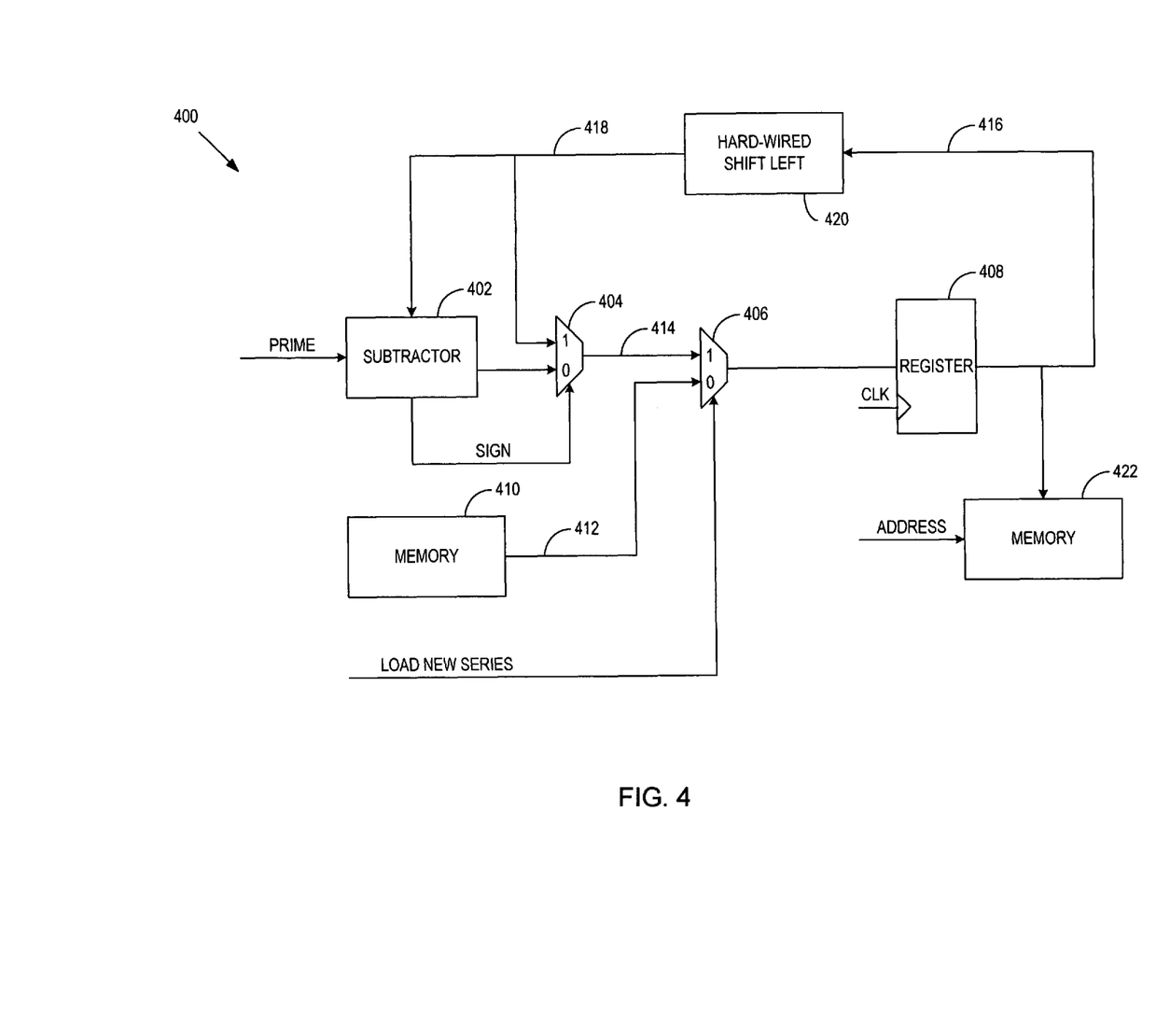
FIG. 4 illustrates an exemplary schematic diagram of an alternate embodiment of a PSV generator.

Turning to FIG. 4, an alternative embodiment is exemplified, in which PSV generator 400 performs an equivalent PSV generation, as described above in relation to FIG. 2, but performs the PSV generation with reduced complexity as discussed in more detail below. PSV generator 400 generates discrete PSV terms as may be defined by equation (3), through repeated evaluations of, for example, the discrete power series of equation (7):

$$\text{PSV}=\{(2^n \bmod p)|n\epsilon\{0:k-1\}\}, \quad (7)$$

where p is a prime number and k is the length of the sequence $\{2^n \bmod p\}$.

Repeated evaluations of discrete power series other than the discrete power series of equation (7) may be used. The repeated evaluation of equation (7), however, may be preferred, since each evaluation involves "shift-left mathematics", thereby reducing the complexity of its hardware implementation. In other words, the discrete power series terms of equation (7) may be calculated as successive multiples of 2, which in turn, may be generated through successive left shift operations. For example, given that p=7 in equation (7), the terms of the discrete power series of equation (7) evaluate to 1, 2, and 4, i.e., 2 successive left shifts of the value 1, before they begin repeating themselves.

Given that the discrete power series terms associated with equation (4) are desired, an example is illustrated, whereby repeated evaluations of equation (7) are used to calculate those terms. The repeated evaluations may be described as in equation (8):

$$\text{PSV}=\{(v^m 2^n \bmod p)|m\epsilon\{0:(((p-1)/k)-1)\}\&n\epsilon\{0:k-1\}\}, \quad (8)$$

where k is the length of the sequence $\{2^n \bmod p\}$ and m is equal to the number of repeated evaluation cycles of equation (7) that are necessary.

Generally, the number of repeated evaluation cycles, m, of equation (7) that are necessary to generate the terms of a particular discrete power series, is equal to the ratio of (p−1) to the number of terms that are generated by equation (7) before repeating. If p=7, for example, then the number of terms generated by equation (7) before repeating is 3, which provides that the number of evaluation cycles of equation (7) is: m=6/3=2.

The terms listed in Table 3 are those terms that are generated by equation (8) through m=2 evaluation cycles of equation (7), for the exemplary case of p=7 and v=5.

TABLE 3

| Term | PSV |
| --- | --- |
| 1 | $(5^0 2^0) \mod(7) = 1$ |
| 2 | $(5^0 2^1) \mod(7) = 2$ |
| 3 | $(5^0 2^2) \mod(7) = 4$ |
| 4 | $(5^1 2^0) \mod(7) = 5$ |
| 5 | $(5^1 2^1) \mod(7) = 3$ |
| 6 | $(5^1 2^2) \mod(7) = 6$ |

Comparing the PSVs of Table 3 to those of Table 1, it can be seen that the value of the PSVs are identical. However, the order of the PSVs are not. Thus, as discussed in more detail below with respect to FIG. 5, a PSV address generator is used to reorder the PSVs of Table 3 into the same order of PSVs as listed in Table 1.

Turning back to FIG. 4, a reduced complexity PSV generator is exemplified, which may be used to generate the discrete PSVs of equation (7). Memory 410 is pre-loaded with initial values of the primitive root, v, that are necessary for the calculation of equation (8). For example, given that the terms associated with the discrete power series of equation (4) are desired, then as discussed above in relation to Table 3, the only discrete power series (DPS) terms, i.e., initial values, that are necessary for the calculation of equation (8) are, $v^m = 5^0 = 1$ and $v^m = 5^1 = 5$, which are pre-loaded into memory 410.

Thus, PSV generator 400 may be understood to be a base power series generator that generates discrete power series as described, for example, by equation (7). Memory 410 may then be understood to provide base power series generator 400 with initial, or new, series values, which are used to initialize base power series generator 400 with DPS terms, $v^m$, as described in equation (8).

At startup, signal LOAD NEW SERIES is de-asserted to a logic value of "0", which is effective to produce the first initial value of the primitive root, e.g., $v^0 = 5^0 = 1$, for the first cycle of equation (7) calculations from memory 410. At the next transition of signal CLK, the logic value of "1" is provided at signal 416, which represents the first PSV as listed in Table 3 to be loaded into memory 422 at the address location defined by signal ADDRESS.

Figure 5:
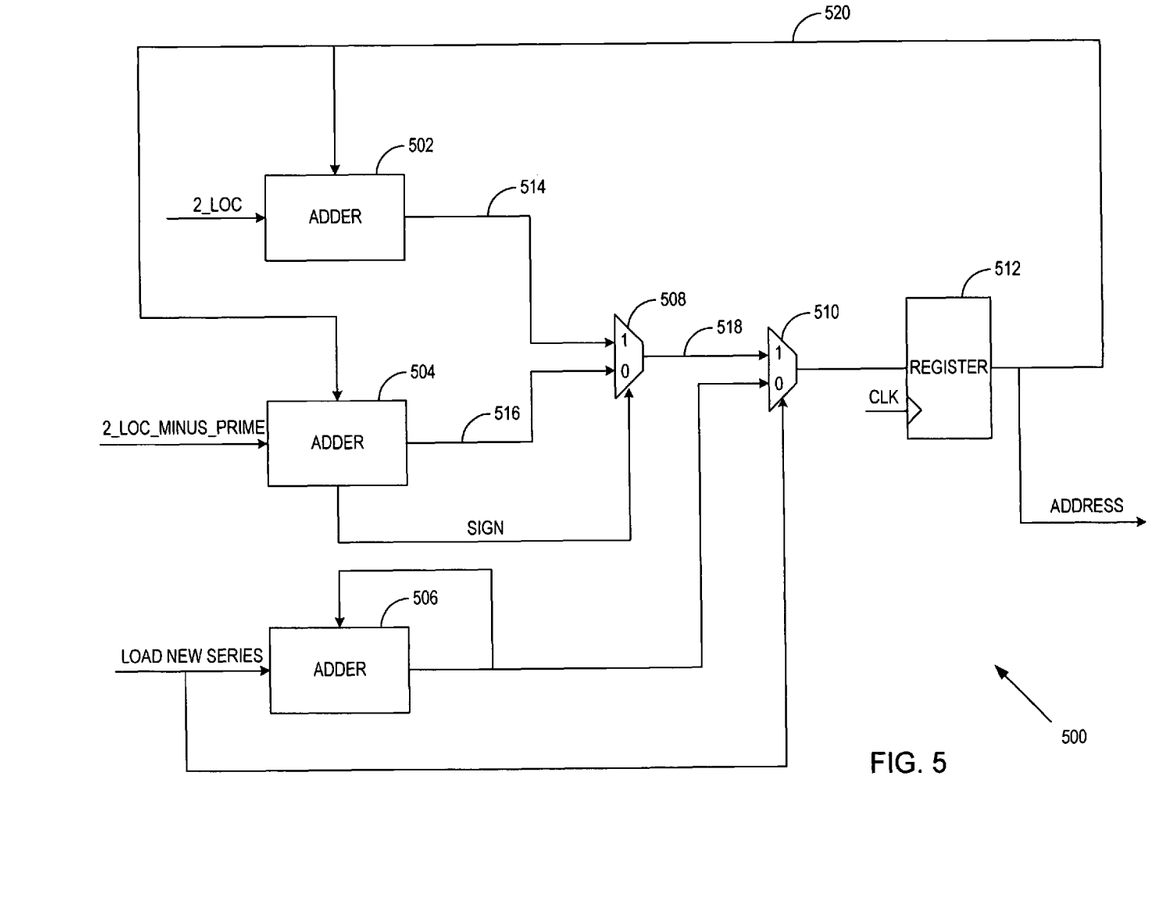
FIG. 5 illustrates an exemplary schematic diagram of an alternate embodiment of a discrete PSV address generator.

Turning to FIG. 5, PSV address generator 500 is exemplified, which provides signal ADDRESS to memory 422. As discussed above, repeated evaluations of equation (7) provide the correct PSV values as listed in Table 3, however, the PSV values are not arranged in the correct order as listed in Table 1. Thus, PSV address generator 500 is used to generate the appropriate value of signal ADDRESS, such that PSVs at signal 416 of FIG. 4 may be written to address locations of memory 422 in correspondence with Table 1.

Signals 2_LOC and 2_LOC_MINUS_PRIME are signals whose values may be pre-determined and pre-loaded into, for example, memory 410 of FIG. 4. Since the particular discrete power series of interest is known, e.g., the discrete power series of equation (4), then the values of signals 2_LOC and 2_LOC_MINUS_PRIME is also known. For example, signal 2_LOC represents the address location of the PSV whose value is "2", which for this example, is the location as listed in Table 1. It can be seen, therefore, that the value of 2_LOC is "4", since the PSV whose value is "2" resides at address location 4 of Table 1. Similarly, the value of signal 2_LOC_MINUS_PRIME is readily calculated to be: 2_LOC−(p−1)=−2, since the value of p is "7" for this example.

At startup, signal LOAD NEW SERIES is de-asserted, so that the initialized output of adder 506, i.e., "0", is provided at the output of multiplexer 510. At the next transition of signal CLK, the value of "0" is provided at signal 520. Thus, the first PSV, e.g., 1, provided by signal 416 is written to memory 422 at address 0, which is in correspondence with Table 1.

Continuing with PSV generator 400 of FIG. 4, the first PSV is then multiplied by two, since block 420 imposes a hard-wired shift-left operation. That is to say, in other words, that the least significant bits (LSBs) of signal 416 are hard-wired to the corresponding LSB+1 bits of signal 418. Thus, $LSB_0$ of signal 416 is hard-wired to $LSB_1$ of signal 418, $LSB_1$ of signal 416 is hard-wired to $LSB_2$ of signal 418, etc. Subtractor 402 then receives the PSV*2 result from block 420 via signal 418 and subtracts it from signal PRIME, which for this example is equal to p=7. Thus, the difference, (PSV*2−p) is presented to the first input of multiplexer 404 from subtractor 402.

Signal 418, i.e., PSV*2, is also provided to the second input of multiplexer 404. The sign of the difference generated by subtractor 402 determines whether the PSV*2 term, or the (PSV*2−p) term is selected by multiplexer 404. In other words, if the difference, PSV*2−p, is a negative value, then signal SIGN is asserted, which causes the PSV*2 term to be provided as signal 414 by multiplexer 404. On the other hand, if the difference, PSV*2−p, is a positive value, then signal SIGN is de-asserted, which causes the (PSV*2−p) term to be provided as signal 414 by multiplexer 404.

The interaction between subtractor 402 and multiplexer 404 becomes significant, once the properties of the mathematical operation performed by PSV generator 400 is realized. In particular, PSV generator 400 generates terms that may be characterized by equation (9):

$$PSV = A * 2^n \mod p, \qquad (9)$$

where A is the pre-loaded, initial value of $v^m$, as described in equation (8), for the particular cycle. For example, the first cycle of evaluations of equation (7) results in a value of A=1, and the second cycle of evaluations of equation (7) results in a value of A=5, given that the discrete power series of equation (4) is desired.

It can be verified, however, that equation (9) may be simplified as follows:

$$PSV = \begin{bmatrix} (A*2) & \text{if } (A*2-p) < 0 \\ (A*2-p) & \text{if } (A*2-p) \geq 0 \end{bmatrix}. \qquad (10)$$

Thus, the calculation of equation (9), the result of which is provided at signal 414, is reduced to a selection of (A*2), if the value of signal SIGN is "1", or the selection of (A*2−p), if the value of signal SIGN is "0". Thus, components 420, 402, and 404 combine to form a simplified modulus operation block, whereby the multiplication operation, as required by equation (9), is simplified to a subtraction and multiplexing operation, since the hard-wired shift left operation of block 420 is implemented with no components at all.

The second PSV is, therefore, calculated as follows. Signal 418 is at a value of "2", since the first PSV, e.g., "1", at signal 416 is multiplied by 2 at signal 418. The value of (A*2−p), as provided by subtractor 402, is "−5", since A=1 for the first cycle, and p=7 for this example. Since the result is negative, i.e., the value of signal SIGN is "1", then signal 418, i.e., A*2=2, is provided at signal 414 by multiplexer 404. The value of signal LOAD NEW SERIES is asserted, thus at the next transition of signal CLK, the value of "2" is provided at signal 416 to be written into memory 422 at the address provided by signal ADDRESS. PSV=2, however, is not the PSV that follows PSV=1, as can be verified upon comparison with Table 1. Thus, signal ADDRESS must be offset to correspond with the address location of PSV=2, e.g., ADDRESS=4, before PSV=2 may be written to memory 422.

Turning to FIG. 5, the offset calculation of signal ADDRESS for PSV=2 is demonstrated. Signal ADDRESS is currently at a value of "0", as provided by signal 520. The output of adder 502, e.g., signal 514, is equal to 2_LOC+0="4", since as discussed above, the predetermined value of 2_LOC is "4". Signal 2_LOC_MINUS_PRIME is predetermined to be "−2" as discussed above. Thus, the output of adder 504, e.g., signal 516, is equal to −2+0=−2, which yields a "1" as the value of signal SIGN. Thus, the value of signal 514, e.g., "4", is provided by multiplexer 508 as signal 518. Since signal LOAD NEW SERIES is asserted, at the next transition of signal CLK, register 512 provides a value of "4" at signal 520. Thus, signal ADDRESS=4 represents the next address location within memory 422, where PSV=2 is to be written. By comparison with Table 1, it is verified that PSV=2 is to be written at address location 4.

Turning back to FIG. 4, the generation of the third PSV is demonstrated. Signal 418 is at a value of "4", since the second PSV, e.g., 2, at signal 416 is multiplied by 2 at signal 418. The value of (A*4−p), as provided by subtractor 402, is "−3", since A=1 for the first cycle, and p=7 for this example. Since the result is negative, i.e., the value of signal SIGN is "1", then signal 418, i.e., A*2=4, is provided at signal 414 by multiplexer 404. The value of signal LOAD NEW SERIES is asserted, thus at the next transition of signal CLK, the value of "4" is provided at signal 416 to be written into memory 422 at the address provided by signal ADDRESS. PSV=4, however, is not the PSV that follows PSV=2, as can be verified upon comparison with Table 1. Thus, signal ADDRESS must be offset to correspond with the address location of PSV=4, e.g., ADDRESS=2, before PSV=4 may be written to memory 422.

Turning back to FIG. 5, the offset calculation of signal ADDRESS for PSV=4 is demonstrated. Signal ADDRESS is currently at a value of "4", as provided by signal 520. The output of adder 502, e.g., signal 514, is equal to 2_LOC+4="8", since as discussed above, the predetermined value of 2_LOC is "4". Signal 2_LOC_MINUS_PRIME is predetermined to be "−2" as discussed above. Thus, the output of adder 504, e.g., signal 516, is equal to −2+4=+2, which yields a "0" as the value of signal SIGN. Thus, the value of signal 516, e.g., "2", is provided by multiplexer 508 at signal 518. Since signal LOAD NEW SERIES is asserted, at the next transition of signal CLK, register 512 provides a value of "2" at signal 520. Thus, signal ADDRESS=2 is the next address location within memory 422, where PSV=4 is to be written. By comparison with Table 1, it is verified that PSV=4 is to be written at address location 2.

After the generation of PSVs 1, 2, and 4, the first cycle of repeated evaluations of equation (7) using the primitive root, $v^0=5^0=1$, is complete. The second cycle begins with a new series whose primitive root, $v^1=5^1=5$, is produced by memory 410 at signal 412 and then selected at the output of multiplexer 406, since signal LOAD NEW SERIES is de-asserted. It can be verified that PSV generator 400 generates PSV values 5, 3, and 6 during the second cycle. It can be further verified that PSV address generator 500 generates PSV addresses 1, 5, and 3, respectively. Upon comparison with Table 1, PSV values of 5, 3, and 6 written to address locations 1, 5, and 3 is the correct placement for PSVs generated in accordance with equation (4).

It can be seen, that the complexity of discrete PSV generation and PSV address generation with respect to FIGS. 4 and 5 is reduced as compared with the complexity of discrete PSV generation and PSV address generation with respect to FIGS. 2 and 3. In particular, the implementation of FIGS. 2 and 3 requires two multipliers, an adder, and two multiplexers. The implementation of FIGS. 4 and 5, on the other hand, requires four adders and four multiplexers. Thus, the need for the two multipliers of FIGS. 2 and 3 is obviated in comparison to the implementation of FIGS. 4 and 5. The column permutation as defined by block 110 of FIG. 1, for example, may be implemented as discussed above in relation to the discrete PSV generator of FIG. 4 and the PSV address generator of FIG. 5.

Figure 6:
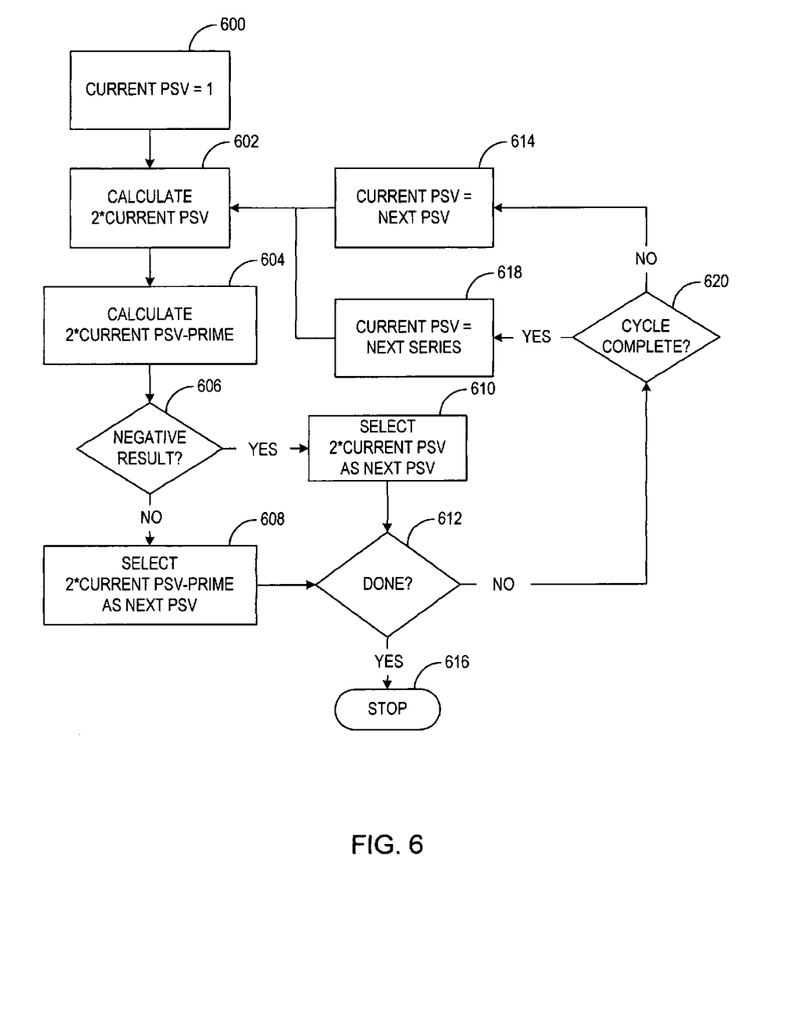
FIG. 6 illustrates an exemplary flow diagram for generating discrete PSVs.

Turning to FIG. 6, a flow diagram of a method of generating discrete PSVs is exemplified. In step 600, the current PSV of the discrete power series is always equal to "1", thus the current PSV may be initialized to "1". The next PSV in the discrete power series is then generated in three phases. First, as in step 602, the quantity (2*current PSV) is calculated, as discussed above in relation to signal 418 of FIG. 4. Next, as in step 604, the quantity (2*current PSV−prime) is calculated, as discussed above in relation to the output of subtractor 402. Next, if the quantity calculated in step 604 is negative, as determined in step 606, then the quantity calculated in step 602 is selected as the next PSV in step 610. Else, the quantity calculated in step 604 is selected as the next PSV in step 608.

In step 612, a determination is made as to whether all of the cycles of equation (7) have been computed. If not, then if the current cycle is not complete as determined in step 620, then the current PSV is set equal to the next PSV as determined in either of steps 608 or 610. If the current cycle is complete, i.e., the next PSV is a duplicate of a previously generated PSV, then the current PSV is set equal to the next series as in step 618, i.e., the next $v^m$ term retrieved from memory 410. Repeated evaluations of equation (7) are continued until all cycles have been completed and the process stops as in step 616.

Figure 7:
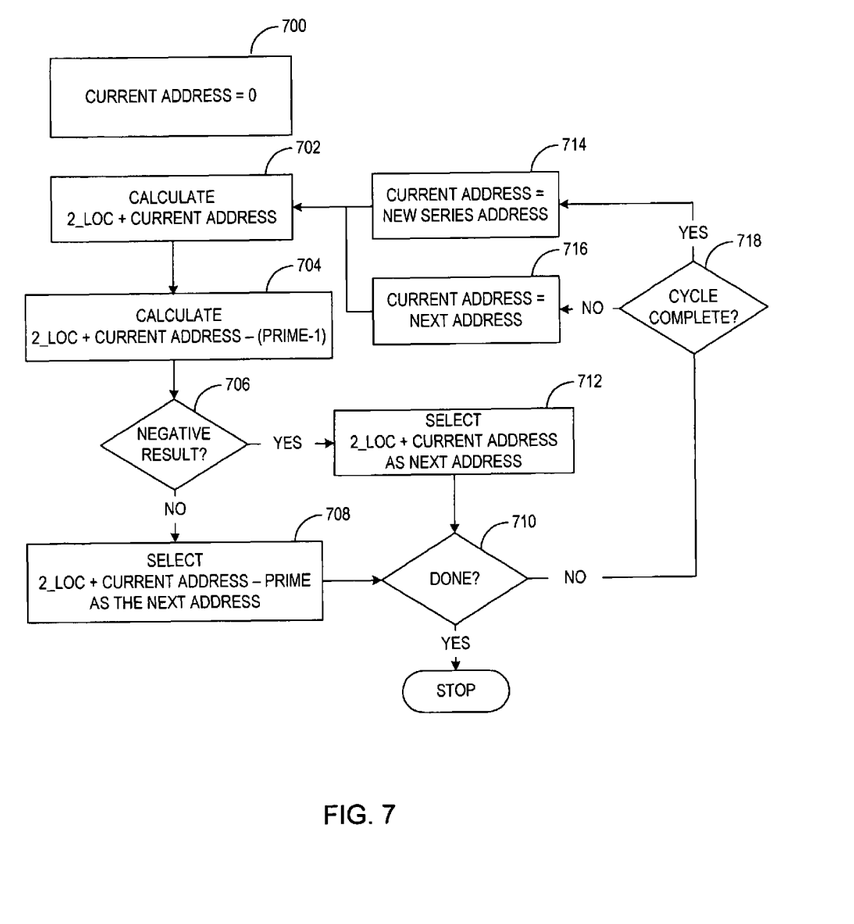
FIG. 7 illustrates an exemplary flow diagram for generating discrete PSV addresses.

Similarly, the PSV address calculations of FIG. 7 are executed to determine the proper address for each PSV calculated by the method of FIG. 6. In step 700, the first address is always equal to "0", thus it is initialized to "0". Subsequent PSV addresses are calculated in three phases. First, as in step 702, a first address, e.g., signal 514 of FIG. 5, is calculated by adding the current address to the location of the value "2", e.g., signal 2_LOC, in the discrete power series being calculated. Next, as in step 704, a second address, e.g., signal 516 of FIG. 5, is calculated by adding the current address to signal 2_LOC and then subtracting the value of (p−1). Finally, if the second address determined in step 704 is negative, as determined in step 706, then the first address determined in step 702 is selected as the next address as in step 712. Else, the second address is selected as the next address as in step 708.

In step 710, a determination is made as to whether all of the cycles of equation (7) have been computed. If not, then if the current cycle is not complete as determined in step 718, then the current address is set equal to the next address in step 716 as determined in either of steps 708 or 712. If the current cycle is complete, however, then the current address is set equal to the next series address as in step 714. Repeated evaluations of equation (7) are continued until all cycles have been completed.

The discrete power series generator with respect to FIGS. 2-6 can in one embodiment be implemented as a soft-core on a field programmable gate array (FPGA) such as the Virtex™ series FPGA from Xilinx, Inc, of San Jose, Calif. In another embodiment the discrete power series generator can be implemented as an application specific circuit on an integrated circuit. In yet a further embodiment the discrete power series generator can be implemented in a software program stored in a computer readable memory.

Other aspects and embodiments of the present invention will be apparent to those skilled in the art from consideration of the specification and practice of the invention disclosed herein. For example, the interleaver as specified in the 3rd Generation Partnership Project (3GPP); Technical Specification Group Radio Access Network: Multiplexing and Channel Coding specification requires the use of a discrete power series generator as described herein. In particular, intra-row permutations of the type described in FIGS. 4-7 may be adapted, through appropriate selection of prime number, p, and primitive root, v, to accommodate the requirements of the 3GPP interleaver. Thus, it is intended that the specification and illustrated embodiments be considered as examples only, with a true scope and spirit of the invention being indicated by the following claims.

What is claimed is:

1. A discrete power series generator, comprising:
   a base power series value (PSV) generator coupled to receive initial values and adapted to generate a set of PSVs for each initial value received;
   wherein the generated $$\text{PSVs} = \{(v^m 2^n \bmod p) | m \in \{0:(((p-1)/k)-1)\} \& n \in \{0:k-1\}\},$$

p is a prime number, v is a primitive root of p, and k is a length of a PSV sequence of $\{2^n \bmod p\}$, and the PSVs are generated in sequential order for n=0 to n=k−1 for each value m, from m=0 to m=((p−1)/k)−1;
   a first memory block coupled to the base PSV generator and adapted to provide the initial values to the base PSV generator;
   wherein the initial values include values of $v^m$, and the first memory block is pre-loaded with a plurality of values of $v^m$, for m∈{0:(((p−1)/k)−1)};
   wherein the base PSV generator includes:
   a shift block coupled to receive each PSV and adapted to shift each input PSV to produce each $v^m 2^n$ term;
   a subtractor coupled to receive the prime number and each $v^m 2^n$ term and adapted to provide a difference between each $v^m 2^n$ term and the prime number; and
   a first multiplexer configured to select the $v^m 2^n$ term as the PSV for input to the shift block in response to the difference being negative, and to select the difference as the PSV for input to the shift block in response to the difference being positive; and
   a base PSV address generator coupled to the base PSV generator and adapted to provide an address for each PSV of the set of PSVs generated.

2. The discrete PSV generator of claim 1, further comprising a second multiplexer coupled to an output of the first multiplexer and coupled to receive each initial value, the second multiplexer adapted to select the output of the first multiplexer in response to a first value of a signal indicating that the generation of the set of power series values is not complete and adapted to select the initial value if a second value of the signal indicates that the generation of the set of power series values is complete.

3. The discrete PSV generator of claim 2, further comprising a second memory block coupled to the second multiplexer and the base PSV address generator and adapted to store the PSV at the address corresponding to each PSV generated.

4. The discrete PSV generator of claim 3, wherein the base PSV address generator comprises:
   a first adder coupled to receive the address and a first predetermined value and adapted to provide a first sum of the address and the first predetermined value; and
   a second adder coupled to receive the address and a second predetermined value and adapted to provide a second sum of the address and the second predetermined value.

5. The discrete PSV generator of claim 4, wherein the base PSV address generator further comprises a third adder coupled to receive the signal and adapted to provide an accumulated sum of the first value of the signal.

6. The discrete PSV generator of claim 5, wherein the base PSV address generator further comprises a first multiplexer coupled to outputs of the first and second adders and adapted to select the first adder output if the second sum is negative and adapted to select the second adder output if the second sum is positive.

7. The discrete PSV generator of claim 6, wherein the base PSV address generator further comprises a second multiplexer coupled to an output of the first multiplexer and to an output of the third adder, the second multiplexer adapted to select the output of the first multiplexer as the address in response to the first value of the signal and adapted to select the output of the third adder as the address in response to the second value of the signal.

8. A power series generator, comprising:
   a modulus operation block coupled to receive a current power series value (PSV) and a prime number and adapted to perform a modulus operation on the current PSV using the prime number to generate a next PSV;
   a first memory block coupled to the modulus operation block and adapted to store the next PSV;
   wherein the modulus operation block includes:
   a shift block coupled to receive the current PSV and adapted to provide a left-shifted PSV from the current PSV; and
   a subtractor coupled to receive the left-shifted PSV and adapted to provide a difference between the left-shifted PSV and the prime number;
   a first multiplexer coupled to receive the difference and the left-shifted PSV, the first multiplexer configured to select the left-shifted PSV in response to the difference being negative and select the difference in response to the difference being positive;
   a second multiplexer having a first input coupled to receive output of the first multiplexer;
   a second memory block coupled to a second input of the second multiplexer, the second memory block adapted to provide a predetermined initial value to the second multiplexer, wherein the second multiplexer selects the output of the first multiplexer as the next PSV in response to a first level of a select signal and the second multiplexer selects the predetermined initial value as the next PSV in response to a second level of the select signal;
   wherein each PSV is an element of $\{(v^m 2^n \bmod p) | m \in \{0:(((p-1)/k)-1)\} \& n \in \{0:k-1\}\}$, v is a primitive root of p, each initial value includes one of the values of $v^m$, and the PSVs are generated in sequential order for n=0 to n=k−1 for each value m, from m=0 to m=((p−1)/k)−1;
   wherein the second memory block is pre-loaded with a plurality of values of $v^m$, for m∈{0:(((p−1)/k)−1)}; and
   a PSV address generator coupled to the first memory block and adapted to provide an address for storage of the next PSV within the first memory block.

9. The power series generator of claim 8, wherein the PSV address generator comprises:
   a first adder coupled to receive the address and a first predetermined value and adapted to provide a first sum of the address and the first predetermined value; and
   a second adder coupled to receive the address and a second predetermined value and adapted to provide a second sum of the address and the second predetermined value.

10. The power series generator of claim 9, wherein the PSV address generator further comprises a third adder coupled to receive the select signal and adapted to provide an accumulated sum of the first level of the select signal.

11. The power series generator of claim 10, wherein the PSV address generator further comprises a third multiplexer coupled to outputs of the first and second adders and adapted to select the first sum if the second sum is negative and adapted to select the second sum if the second sum is positive.

12. The power series generator of claim 11, wherein the base PSV address generator further comprises a fourth multiplexer coupled to an output of the third multiplexer and to an output of the third adder, the fourth multiplexer adapted to select the output of the third multiplexer as the address in response to the first value of the select signal and adapted to select the output of the third adder as the address in response to the second value of the select signal.

13. A method of generating discrete power series values (PSVs), the method comprising:
   retrieving at least one discrete power series (DPS) term from a memory block;
   cycling, using a shift-left circuit, the DPS term through a plurality of shift-left operations, each cycle producing a left-shifted DPS term;
   subtracting, using a subtractor circuit, a prime number from each left-shifted DPS term to form a difference;
   selecting the left-shifted DPS term as the PSV in response to a negative difference;
   selecting the difference as the PSV in response to a positive difference;
   wherein each PSV is an element of $\{(v^m 2^n \bmod p) | m \in \{0:(((p-1)/k)-1)\} \& n \in \{0:k-1\}\}$ p is a prime number, v is a primitive root of p, $v^m$ is the at least one DPS term, k is a length of a PSV sequence of $\{2^n \bmod p\}$, and the PSVs are generated in sequential order for n=0 to n=k−1 for each value m, from m=0 to m=((p−1)/k)−1,
   wherein the memory block is pre-loaded with a plurality of values of $v^m$, for $m \in \{0:(((p-1)/k)-1)\}$, and each retrieved DPS term is one of the plurality of values of $v^m$;
   generating using an address generator, an address for each PSV; and
   storing each PSV in a memory at the generated address.

14. The method of claim 13, further comprising:
   determining a next address based on predetermined offsets to a current address; and
   storing the PSV at the next address.

15. The method of claim 14, further comprising:
   retrieving an accumulated address as the next address in response to generating a duplicated PSV; and
   storing the PSV at the next address.

* * * * *